March 1, 1932.  C. C. WORTHINGTON  1,847,683
ROTARY CUTTER
Filed Feb. 2, 1926   2 Sheets-Sheet 1
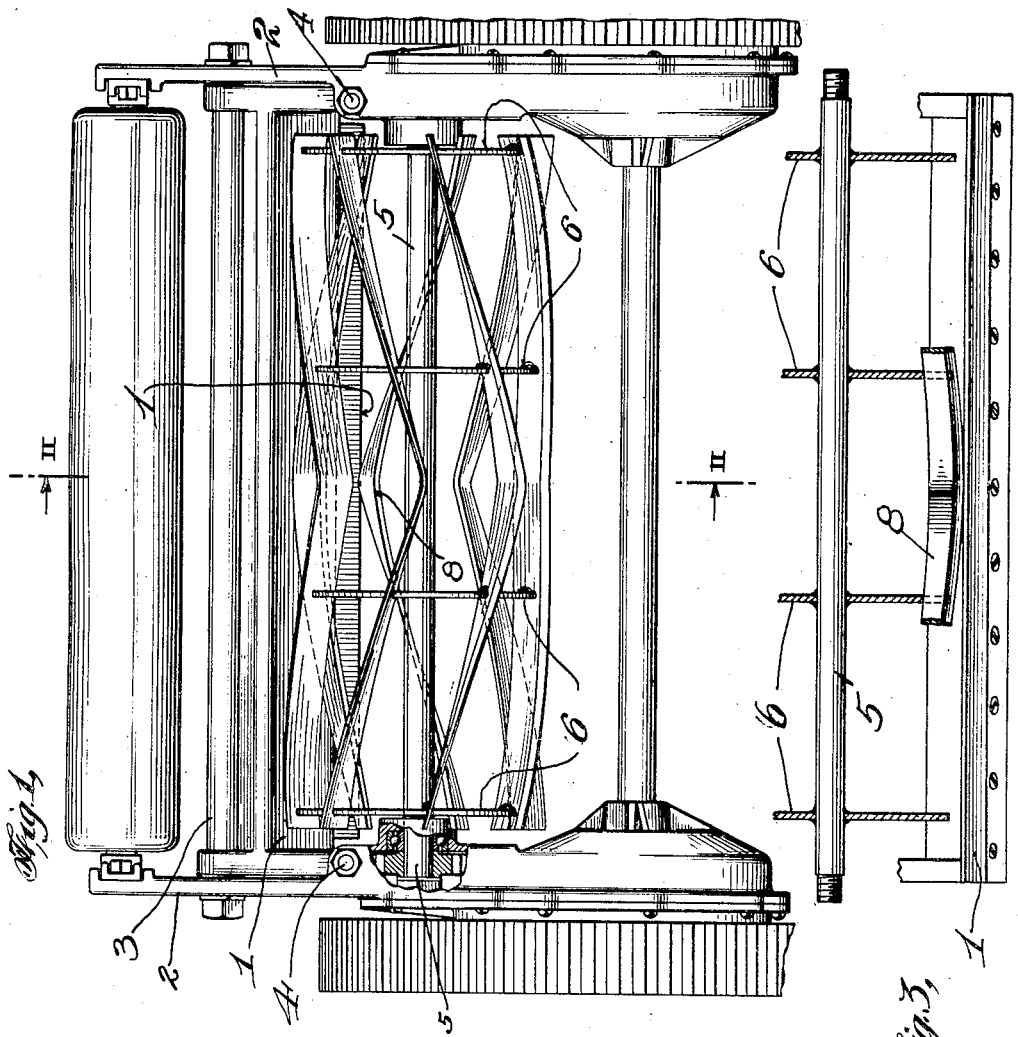
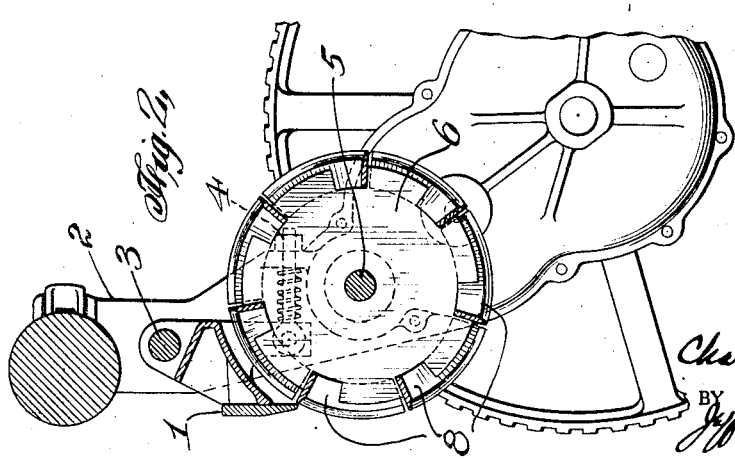
INVENTOR
Charles C. Worthington
BY
ATTORNEY

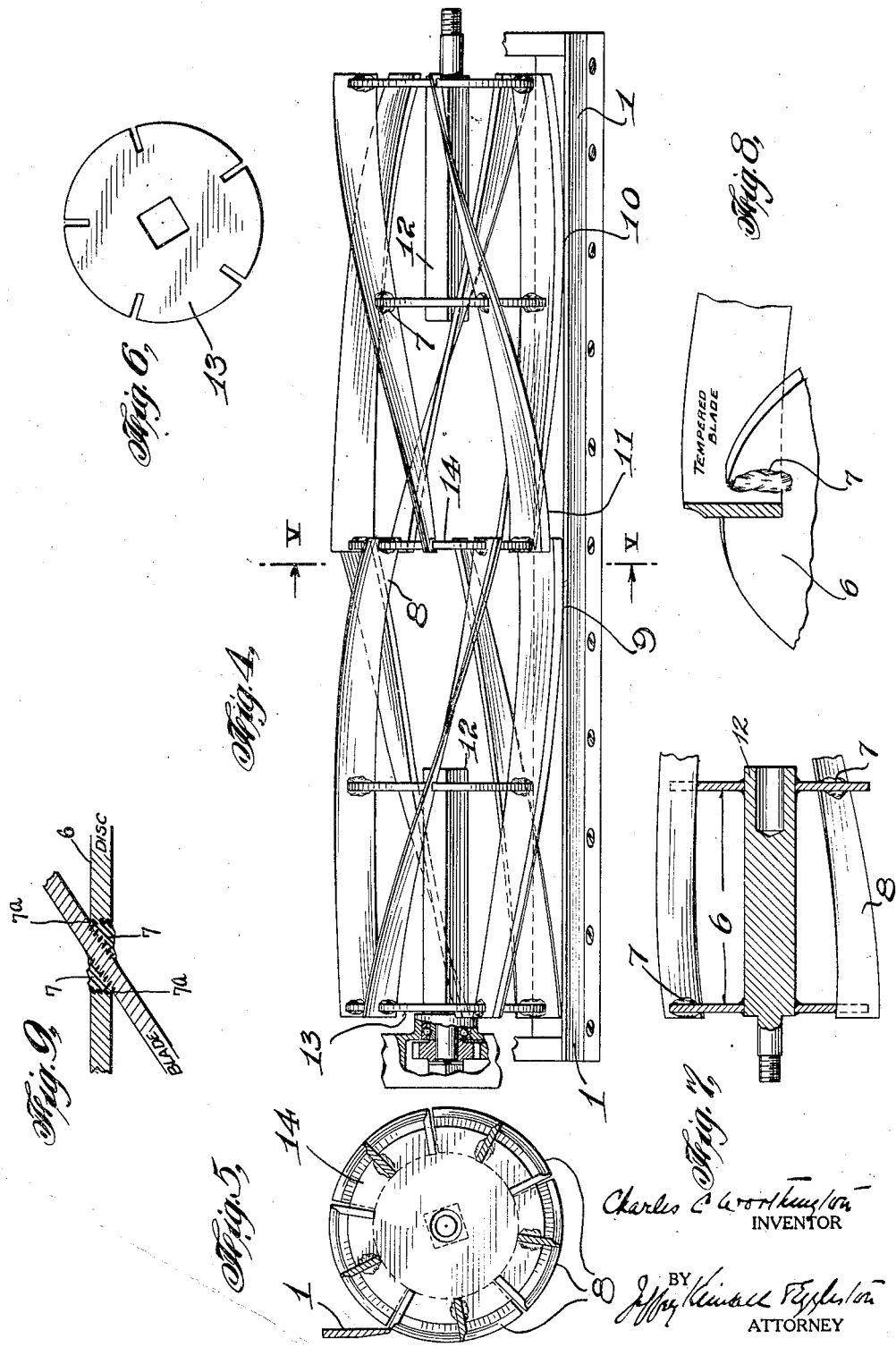

Patented Mar. 1, 1932

1,847,683

UNITED STATES PATENT OFFICE

CHARLES C. WORTHINGTON, OF DUNFIELD, NEW JERSEY

ROTARY CUTTER

Application filed February 2, 1926. Serial No. 85,455.

The object is the improvement of lawn mowers and more especially their rotary cutters or fly knives, and is accomplished by the means and method of securing the cutter blades to the axle, using sheet-metal die-punched carrier discs for that purpose as more fully described below, whereby such knives can be made with less labor and with substantially perfect initial and permanent accuracy of dimensions, and also by the employment of a certain herringbone blade arrangement in fly knives, so made, thereby further improving the smoothness of their operation.

The accompanying drawings illustrate the preferred forms of the invention in which Fig. 1 is a top plan, parts removed, Fig. 2, a central cross-section of Fig. 1, Fig. 3, a longitudinal section on a plane through the fly knife axis and the edge of the bed knife, Fig. 4, a modified form in plan, Fig. 5, a section on V—V, Fig. 4; Fig. 6, a detail; Fig. 7, a longitudinal section of the axle structure; Fig. 8, a perspective detail of blade and disc, and, Fig. 9, a detail on the welded bond between them.

The invention is illustrated in a lawn mower of conventional type of which the bed knife 1 of any appropriate design is adjustably but rigidly secured to and between the two side frames 2 which latter form the housing, as usual, for the gearing by which the fly-knife is driven from the ground wheels. The bed knife structure is supported at its rear on a heavy cross shaft 3 and extends forwardly therefrom, under the fly knife, where the bed knife blade is secured by bottom screws as usual. Adjustment toward and from the fly-knife is effected in the present case by a bolt 4 at each end which holds the bed knife against the fly-knife so that it is rigidly supported so far as the action of the fly-knife is concerned; the spring shown in Fig. 2 is merely for keeping the bolt tight. Any other form of bed knife support and adjustment can be used in place of that illustrated.

In Figs. 1 to 3, the fly-knife comprises a shaft or axle structure 5 journalled at its ends in ordinary ball bearings in the side frames and connected within the latter to the pinions by which it is driven. In place of the usual cast iron blade-supporting spiders, the shaft carries a series of sheet metal discs 6, each of which is centrally punched to fit the shaft and spot-welded to it. The circumferential edges of these discs are radially notched or slotted at equal angular distances apart, to receive the cutter blades and the latter, previously bent to helical shape, are secured in these notches, also by the process of spot-welding. These blade-supporting discs are made in an ordinary punch press which simultaneously forms the center hole and the blade notches and they are superior to the old cast-iron spiders or carriers because they possess the accuracy of dimension of the dies in which they were made and retain this accuracy permanently without change from shrinkage, warping or other causes to which the cast iron supports are subject. The construction of the fly-knife with such die-punched blade supporters is one of the features of this invention. Moreover, I have discovered that it is easily possible to secure the blades to the discs by welding without drawing the temper of the blades notwithstanding their slender nature, and this method is not only quicker than riveting, because not dependent upon the registry of rivet holes, but it produces a much stronger fly-knife, weight for weight, because rivets are essentially pivot joints whereas the welded joints are permanently rigid. The new fly-knife is thus virtually a single piece of metal, but its blades are of properly tempered steel. This method of blade attachment is also a feature of the present invention. The spot-welding is done by depositing a small bit of metal, electrically or gas-melted, at the junction of the blade and disc as indicated at 7 in Figs. 8 and 9. Referring to the latter figure, it will be seen that the width of the notch in the disc is coordinated to the thickness and angle of the blade so that the latter is supported thereon at the corners 7ª, the walls of the notch being square to the plane of the disc. This gives a direct bearing of the blade on the disc and while also providing a cavity on each side to receive the drop of welding metal.

The reverse pitch of the blade structure of the fly-knife shown in Figs. 1 to 3 is obtained by reversely bending or twisting the opposite ends of each blade, producing a herringbone effect, so that the fly-knife has a left-hand pitch on one end and a right-hand pitch on the other. As thus made each blade makes its initial contact with the bed knife by its apex which is preferably at the center. Figs. 1 and 3 illustrate a blade 8 in the act of engaging the bed knife and it will be seen that as this blade continues in rotation, two points of cutting contact are produced, moving from the center to the ends of the bed knife, this being in contrast to the common fly knife in which the contact occurs at one or both ends and travels to the opposite end or to the center.

In Figures 4 to 7 the same principle is embodied in a longer fly-knife. The reversely pitched blade portions are here constituted of independent blades of opposite pitch, those of one pitch slightly overlapping those of the other at the center. Each of these blades first engages the bed knife with its leading end but at or near the center of the latter, and this form has the advantage that when each blade makes its initial contact, the point of contact of the next preceding blade is then not far removed and the preceding blade is still bearing on the central region of the bed knife which obviously tends to reduce vibration because it tends to hold the bed knife steady against upward vibratory movement at this moment. There are five cutter blades in this fly-knife of each pitch, and accordingly, ten initial blade contacts at the center of the fly-knife on each rotation. In the seven blade fly-knife of Fig. 1 there are only seven such contacts. In Fig. 4, the points of contact will be seen at 9 and 10; before 9 has proceeded very far to the left, the next following cutter blade 11 will have made its center contact.

The use of sheet metal die-punchings for the blade supports, spot-welded as described, produces such a degree of rigidity that it is not necessary for the fly-knife axle to extend continuously from one end to the other, and the total weight can thus be reduced by omitting the middle part as illustrated by Figure 4. The two longitudinally separated shaft sections 12, 12 each secured to the two adjacent discs at the ends of the fly-knife constitute the axle, serving the same function as the through shaft of Fig. 1. Preferably these separated shaft sections are square or angular so as to have a firm driving connection with the discs 13 to which they are welded. The central disc 14 in this case must be provided with a double set of blade notches as indicated in Fig. 5; this disc is a blade-supporting element like the others, in the sense that it spaces and secures the blades against displacement.

In the small fly knife of Fig. 1 the blades are relatively thin and can be sprung into the disc notches after the discs have been welded to the axles structure; in the large fly knife of Fig. 4, they are inserted endwise into the notches, by a screwing action, the width of said notches being predetermined with reference to this method of insertion and as explained above; in both cases the blades are retained in place by the notches additionally to the welding which simplifies the welding operation.

It will now be apparent that some or all of the principles above explained can be incorporated in fly-knives of different form and design from both of those shown and it will be understood that all such embodiments are intended to be covered by the following claims.

I claim:

1. The method of making lawn mower fly knives which consists in forming a set of equal diameter discs by punching them in dies out of sheet metal, giving each disc a central axle-fitting perforation and each a series of punched blade-positioning notches around its rim, securing a fly knife axle in and to the perforations of said discs and securing fly knife blades in and to said notches by welding them therein.

2. A lawn mower fly knife comprising an axle, a series of equal diameter die-punched sheet metal discs having central perforations fitting the axle and cutter blades secured to said discs.

3. A lawn mower fly knife comprising an axle, a series of identical die-punched sheet metal discs having central perforations fitting said axle and circumferential notches and helical cutter blades welded in said notches.

4. A lawn mower fly knife comprising an axle, a plurality of sheet metal blade-supporting stampings welded thereto, and helical cutter blades welded to said stampings.

5. In a lawn mower, a fly knife comprising two longitudinally separated shaft sections, a series of helical cutter blades and a series of die-punched sheet metal blade-supporting elements to which said blades are welded, two of said elements being secured to each of said shaft sections.

6. A lawn mower fly-knife comprising an axle, a plurality of flat sheet-metal blade-supporting stampings having central axle-receiving perforations engaged by the edges of said perforations to said axle and welded thereto, and having a plurality of blade-positioning seats formed in the peripheries of said stampings and helical fly-knife blades secured in said seats.

7. A lawn mower fly-knife comprising an axle, a plurality of sheet-metal blade-supporting stampings having central axle-receiving perforations and peripheral, blade-positioning notches, and helical fly-knife blades welded in said notches, the width of said notches being corelated to the thickness and angle of the blades so as to engage the same by the corners of the notch and provide a cavity adjacent such corner, and a portion of the welding metal contained in such cavity.

8. A lawn mower fly-knife comprising a plurality of spaced die-punched sheet metal discs having circumferential blade receiving notches, cutter blades welded in said notches, said discs also having punched registering apertures and uniting means passing through and welded in said apertures.

In testimony whereof, I have signed this specification.

CHARLES C. WORTHINGTON.